(12) United States Patent
Yamamichi et al.

(10) Patent No.: US 7,076,090 B2
(45) Date of Patent: Jul. 11, 2006

(54) IMAGE INFORMATION APPARATUS

(75) Inventors: Youji Yamamichi, Tokyo (JP); Tetsuya Onishi, Tokyo (JP)

(73) Assignee: Konica Corporation, Tokyo (JP)

( * ) Notice: Subject to any disclaimer, the term of this patent is extended or adjusted under 35 U.S.C. 154(b) by 689 days.

(21) Appl. No.: 09/962,655

(22) Filed: Sep. 25, 2001

(65) Prior Publication Data

US 2003/0206647 A1    Nov. 6, 2003

(30) Foreign Application Priority Data

Sep. 29, 2000    (JP)    ............................. 2000-298560

(51) Int. Cl.
*G06K 9/00*    (2006.01)
(52) U.S. Cl. .................... 382/128; 382/305; 707/6; 707/7; 345/530
(58) Field of Classification Search ................ 382/305, 382/306, 128; 345/530–574; 707/6, 7; 364/900; 711/118–146, 217, 218, 163, 164
See application file for complete search history.

(56) References Cited

U.S. PATENT DOCUMENTS

| | | | | |
|---|---|---|---|---|
| 4,115,805 A | * | 9/1978 | Morton | 382/305 |
| 4,408,181 A | * | 10/1983 | Nakayama | 382/306 |
| 4,698,671 A | * | 10/1987 | Garcia | 378/98.2 |
| 4,727,435 A | * | 2/1988 | Otani et al. | 358/296 |
| 4,817,050 A | * | 3/1989 | Komatsu et al. | 707/10 |
| 5,446,881 A | * | 8/1995 | Mammel, Jr. | 707/1 |
| 5,606,611 A | * | 2/1997 | Kitada | 380/216 |
| 5,907,848 A | * | 5/1999 | Zaiken et al. | 707/202 |
| 6,006,191 A | * | 12/1999 | DiRienzo | 705/2 |
| 6,247,031 B1 | * | 6/2001 | Sugiura et al. | 715/526 |
| 6,446,086 B1 | * | 9/2002 | Bartlett et al. | 707/200 |
| 6,453,059 B1 | * | 9/2002 | Ogawa | 382/132 |

OTHER PUBLICATIONS

Lisa Gottesfeld Brown; "A Survey of Image Registration Techniques"; ACM Computing Surveys, vol. 24, No. 4, Dec. 1992; p. 344, left column, 2nd paragraph.*

* cited by examiner

*Primary Examiner*—Joseph Mancuso
*Assistant Examiner*—Craig Kronenthal
(74) *Attorney, Agent, or Firm*—Frishauf, Holtz, Goodman & Chick, P.C.

(57) ABSTRACT

The invention concerns an image information apparatus that stores a plurality of image information corresponding to a plurality of images. The apparatus includes a receiving section to receive the plurality of image information, an ID information reading section to read the ID information corresponding to the image information, a memory section to store the plurality of image information and the ID information read by the ID information reading section relatively, and an ID distinction section that outputs an ID distinction-signal when detecting that the second ID information does not coincide with the first ID information. The memory section stores a plurality of the image information corresponding to the first ID information, before the second ID information is received, when the memory section receives the ID distinction-signal outputted by the ID distinction section.

8 Claims, 6 Drawing Sheets

FIG. 3 - a
FIG. 3 - b
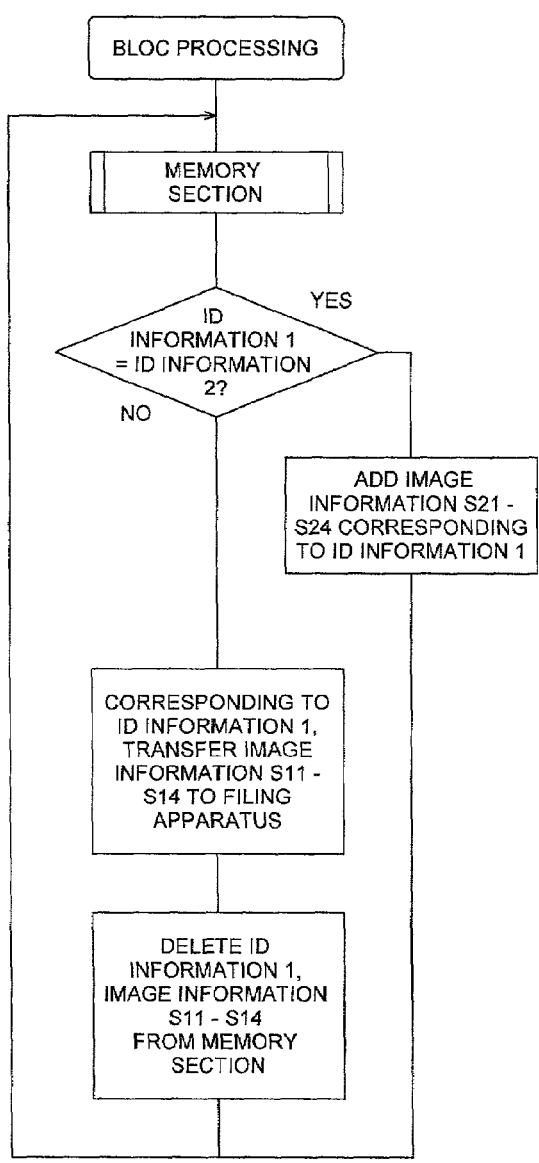
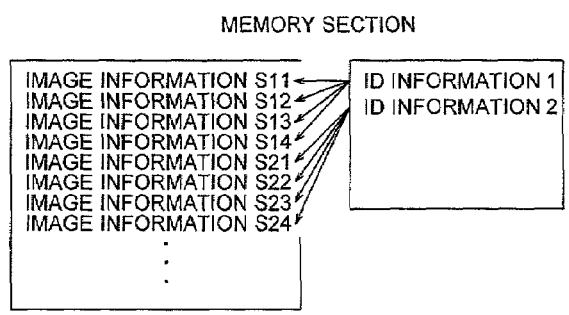
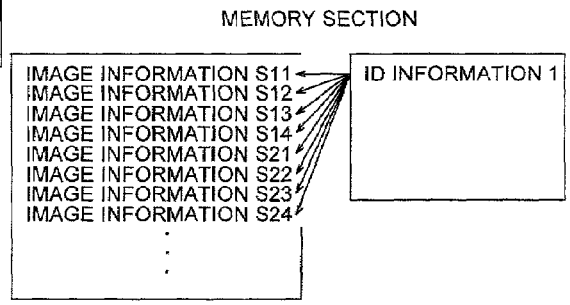
FIG. 3 - c

FIG. 4 - a
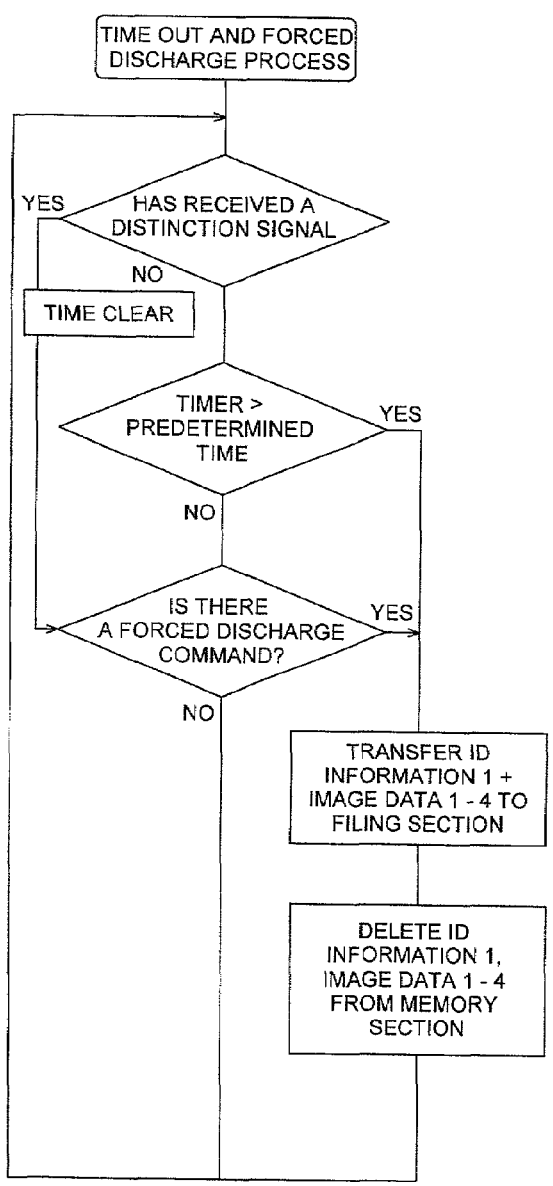
FIG. 4 - b
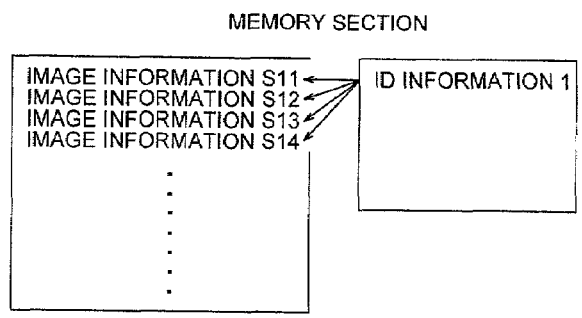
FIG. 4 - c
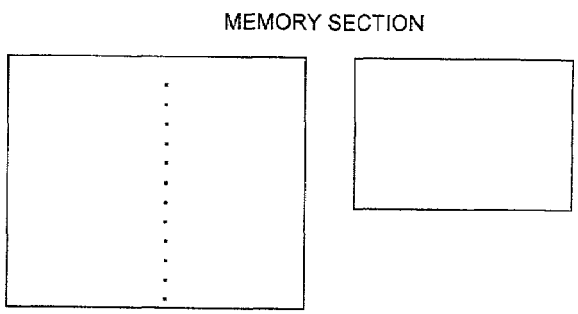

IN THIS EXAMPLE, DUE TO NOISE IN THE IMAGE, THERE IS A POSSIBILITY
THAT THE LETTERS WILL BE RECOGNIZED AS ?00???????

READING ORDER

IMAGE INFORMATION APPARATUS

BACKGROUND OF THE INVENTION

This invention regards an image information apparatus that is used for medical diagnosis related images as well as photographs and medical images containing data about patients in the form of letters, distinguishing ID information from said images containing images of the subjects and ID information, and filing and reproducing said images.

Currently, imaging systems are in use that perform various types of image processing on image information from medical images produced by CT, MRI, and the like on sources such as the body, reproduce and memorize said images, and use said image information to reproduce images of said subjects on photographic materials or into visible images on a CRT.

These image memorizing and reproduction systems memorize images from various modalities (imaging methods and apparatuses for CT, MRI, and the like), and regularly search said image information from memorized image information and reproduce said image information.

The search conditions used in searching image information for medical images consists, generally, of ID such as patient name, ID number, photography date, and birth date, and image information is memorized in coordination with said ID information (electronic information derived by the ID reading section). Said ID is normally composed of kanji characters, kana characters, English letters, numbers, and symbols (hereafter referred to as "letters") attached at the time of medical imaging.

In general, image information apparatuses manage images by individual ID, and Tokkaihei 10-21365 deals with an apparatus for managing image information that is automatically memorized with both its corresponding ID information and image information containing said ID information. That is, it describes one aspect of the invention, that recognizes ID information derived by the ID reading section from image information containing ID information taken by imaging systems such as CTs and MRIs, and using said ID information as search information, memorizes image information in the memorizing section in correspondence with said ID information.

However, in the case of the aforementioned aspect, if for example the ID reading section were to read the first ID information in correspondence with the first image information, the memorizing apparatus would first memorize the first ID information in correspondence with the first image information. However, even if the ID information read from the second image information were the same as the first ID information, it would be memorized as separate ID information (for example, second ID information) in correspondence with the second image information.

In the case that for a single patient this type of image information which has the same ID information were to have multiple instances, the memorizing apparatus would create multiple pairs of individual ID information and individual image information (for example, a pair of first ID information and first image information).

Due to this, although there may be multiple images which contain the same ID information, the memorizing apparatus operator must manage image information for each pair described above, causing operations to be excessively cumbersome.

Also, there is the concern that there may be different problems with the actual implementation, in cases where after initial medical imaging has concluded, imaging of the subject is discontinued for some time, or if for whatever reason a subject that needs a separate ID (such as another patient) is not imaged, causing images not to be sent to the memorizing section, leaving ID information and image information in said memorizing section, resulting in misoperation due to excessive burden placed on said memorizing section.

There currently exists as a method of gaining ID information by the ID reading section from images containing ID the template matching method, which uses a template of letters (selectable letters) which compose the ID to be recognized, comparing said template to letters within the image and recognizing said letters. This method matches all templates successively to the area selected for recognition from the image, selecting the template which is the optimal matching result as the recognition result, and if there is no area selected for recognition for an image, progressively staggers the recognition area and performs matching over the entire image.

However, when trying to recognize letters when images and letters are mixed, misrecognition of letters overlapping the image and misrecognition of letters due to flickering caused by noise as explained in FIG. 6 "Example of video noise" is easy. Even in the case of ordinary letters, letters which resemble each other, such as I (capital i), l (lower case L), and 1 (the number one) (hereafter referred to as "similar letters") have little difference in their evaluation values and are easily misread, leaving recognition results with low credibility.

In this case, the image information will be filed with the corresponding incorrectly recognized ID information, causing difficult later when users attempt to search for said information, and becoming the cause of incorrect prescription due to misdiagnosis.

Tokkaihei 10-21234 proposes a letter recognition apparatus and an image inputting/outputting system using said letter recognition apparatus which sounds a warning signal to its operator when it encounters letters prone to misrecognition during its letter recognition process, requesting verification or correction of the letter detected during letter recognition.

However, the above mentioned letter recognition apparatus requires a determination section to determine whether the results of letter recognition are questionable or not, as well as a warning section to warn the operator, causing the price of the apparatus to be high. In addition, because a warning signal is given simply because the results of letter recognition are questionable, requiring verification or correction by the operator, operation becomes more cumbersome and operating efficiency is decreased.

In order to solve these problems, Tokkaihei 10-134071 describes the section which outputs letter recognition results to the image reproduction section when outputting visual images.

However, the above mentioned method requires to operator to directly observe the image output by said image reproduction section in order to verify if letter recognition is correct or not, and said visual inspection can be a cause of misoperation, in addition to the fact that in the event of operator detection of incorrect recognition, the operator must commence correction of said results, leading to decreased operating efficiency.

SUMMARY OF THE INVENTION

To overcome the abovementioned drawbacks in conventional image-recording apparatus, it is an object of the present invention to provide image information apparatus, which assign a single ID to a plurality of images for a single patient using letter recognition of images for printing, allowing efficient image data filing, as well as efficient image data searching and reproduction.

In particular, it is another object of the present invention to provide image information apparatus which, allow, even in the case of misread letters, image data and letter information to be corresponded and memorized without individual correction by operators.

Accordingly, to overcome the cited shortcomings, the abovementioned object of the present invention can be attained by image information apparatus described as follow.

(1) An image information apparatus that stores a plurality of image information corresponding to a plurality of images, and ID information corresponding to each ID included in each of the images, comprising: a receiving section to receive the plurality of image information; an ID information reading section to read the ID information corresponding to the ID included in each of the plurality of image information received by the receiving section; a memory section to store the plurality of image information and the ID information read by the ID information reading section relatively; and an ID distinction section that determines whether or not a first ID information, which is read by the ID information reading section and corresponds to a first image information, coincides with a second ID information, which corresponds to a second image information read at next to the first image information, and that outputs an ID distinction-signal when determining that the second ID information does not coincide with the first ID information; wherein the memory section stores a plurality of the image information, which are stored in the memory section before the second ID information is received, corresponding to the first ID information, when the memory section receives the ID distinction-signal outputted by the ID distinction section.

(2) The image information apparatus of item 1, further comprising: a timer section to count a predetermined time interval in reference to a specific time interval from the time when the receiving section receives the first image information to the time when the memory section receives the ID distinction-signal, wherein, in case that the predetermined time interval has elapsed until the memory section receives the ID distinction-signal, the memory section memorizes a plurality of the image information, which are accumulated during the predetermined time interval after the receiving section receives the first image information, corresponding to the first image information.

(3) The image information apparatus of item 1, wherein the ID includes a letter and the ID information includes a letter-signal corresponding to the letter.

(4) The image information apparatus of item 3, wherein the ID information reading section comprises: a discrimination-signal generator that outputs a discrimination-signal corresponding to the letter when the ID information reading section does not read the letter-signal; and a converter to convert the discrimination-signal outputted by the discrimination-signal generator into a letter signal in case of not outputting the discrimination-signal.

(5) The image information apparatus of item 1, wherein the memory section memorizes the second ID information as the first ID information, and memorizes the second image information corresponding to the first ID information, when the memory section does not receive the ID distinction-signal.

(6) The image information apparatus of item 1, further comprising: a transferring section that transfers a plurality of the image information, stored in the memory section until the second image information is received, to a prescribed image storing device while correlating them with the first ID information, when the memory section receives the ID distinction-signal outputted by the ID distinction-signal outputting section.

(7) An image information apparatus that stores a plurality of image information corresponding to a plurality of images, and ID information corresponding to each ID located in each area of the images, comprising: a receiving section to receive the plurality of image information; an ID information reading section to read the ID information corresponding to the plurality of image information received by the receiving section; and a memory section to store the plurality of image information and the ID information read by the ID information reading section relatively; wherein the memory section stores a plurality of the image information, which are stored in the memory section before a different ID information is received, corresponding to the ID information.

(8) The image information apparatus of item 7, further comprising: a timer section to count a predetermined time interval in reference to a specific time interval from the time when the receiving section receives the image information to the time when the memory section receives the ID distinction-signal, wherein, in case that the predetermined time interval has elapsed until the memory section receives the ID distinction-signal, the memory section memorizes a plurality of the image information, which are accumulated during the predetermined time interval after the receiving section receives the image information, corresponding to the image information.

Further, to overcome the abovementioned problems, other image information apparatus, embodied in the present invention, will be described as follow:

(9) The image information apparatus of this invention has a receiving section which receives a plurality of image information, with IDs in said plurality of images as described above, with corresponding memorized plurality of image information and ID information as described above, an ID information reading section which reads IDs are described above from a plurality of images from the plurality of image information received from the receiving section described above, said plurality of image information, a memory section that memorizes corresponding ID information read by said ID information reading section, an ID distinction-signal outputting section that determines if the first image information that corresponds to the first ID information read by said ID information reading section is the same as the second image information that corresponds to the second ID information read in next, which outputs an ID distinction-signal if they do not coincide, and said memory section, upon receipt of said ID distinction-signal from said ID distinction-signal outputting section, memorizes all stored image information prior to receipt of the second image information in correspondence with the first ID information.

The expression "plurality of images" refers to the existence of multiple image units composed of at least one image data (single shots) derived through imaging by imaging apparatuses such as CT or MRI used for imaging subjects (including the human body). For example, if a receiving section receives 24 image data of a total of 48 image data derived from a single subject as a single image unit, there will be at least two image units received, meaning that multiple image units exist, and these 48 individual image data form a plurality of images.

In actuality, when image viewers such as doctors see images with the naked eye, they view them on photographic materials as visible images on a CRT, and each sheet of photographic material or each CRT screen of output image can be considered a single image unit. In other words, if there exist two sheets of photographic material containing at least a single image datum, then two image units exist, forming a plurality of images. An "image" is a single unit of said image units, and includes that which is output to said photographic materials as well as electrical (not visible to the naked eye) image information itself derived from CT, MRI, and other imaging apparatuses.

The expression "ID" refers to search conditions necessary to identify an individual image from a plurality of images, and is made up from elements such as patient name, patient ID, imaging date, birthday, and the like, which are composed of kanji characters, kana characters, English letters, numbers, and symbols (hereafter referred to as "letters"). As long as the search conditions can identify an individual image from a plurality of images they are considered adequate, and actual characteristics of the subject (for example, bone structure or afflicted internal organ regions) can be used as search conditions. Saying that this ID is "contained" in the image refers to the fact that when outputting this image to photographic materials or a CRT, this is shown in the exported image. In the case of the image existing as image information in electrical form, said ID forms part of the image information, and unless special outline extraction processing is performed, the ID exists in image information that is in a state that can be mass processed (a state than can be sent or received as a whole). The "ID information" referred to in this invention is the conversion into electrical form of said search conditions derived by the ID information reading section.

Furthermore, "memorizing in correspondence" means to use said ID information and the image information pertaining to the image from which said ID information was read and memorize them in electrical form. To provide an example in line with item 1, when a certain image information (herein referred to as first image information) and first ID information derived by the reading of the first image information by the ID reading section coexist, the memory section will set and memorize the first ID information as the search condition for the first image information.

Search information can consists of all ID information recognized that corresponds to image data or a portion thereof. For example, if the ID information consists of multiple data, such as patient name, ID number, and imaging date, these can be corresponded as search information, or a single one can be selected, for example, ID number, and corresponded and memorized as search information. Additionally, the first letters from each said ID information composed of multiple letters can be corresponded as search information.

"Then" refers to the time immediately after ID information has been read from an image unit on a timeline wherein an ID reading section reads ID information from a plurality of images one image unit at a time.

For example, FIG. 7 shows the process of obtaining ID information "a", "b", and "c" that corresponds to image information A, B, and C, wherein the ID information reading section reads in order of A, B, C, and after reading B to get "a", "then" indicates that it will read C to get "c".

In the same way, after reading A to get "a", "then" indicates reading B and getting "b", and not the process of reading C to get "c", yet if B did not contain an ID, the ID reading section would not read an ID from B, and "then" would indicate reading C to get "c".

Additionally, for this invention, after said receiving section receives said first image information, said memory section contains a timer which counts a predetermined time to receive said ID distinction-signal, and if said memory section exceeds said predetermined time before receiving said ID distinction-signal, said receiving section will memorize a plurality of said image information, which are accumulated during said predetermined time interval after said receiving section receives said first image information, corresponding to said first ID information.

Said ID must contain at least one letter, said ID information must contain at least one letter signal for said letter, and said ID reading section must read at least one of said letter signals of said letters in said ID.

When using the above reading method, if said ID information reading section does not read at least one of said letter signals of said letters in said ID, it should contain a discrimination-signal generator that outputs a discrimination-signal corresponding to said letter and a converter to convert said discrimination-signal outputted by said discrimination-signal generation into a letter signal in case of not outputting said discrimination-signal.

BRIEF DESCRIPTION OF THE DRAWINGS

Other objects and advantages of the present invention will become apparent upon reading the following detailed description and upon reference to the drawings in which:

FIGS. 3-*a*, 3-*b* and 3-*c* show an explanatory diagram of bloc processing;

FIGS. 4*a*, 4-*b* and 4-*c* show an explanatory diagram of time out and forced discharge process;

DETAILED DESCRIPTION OF THE PREFERRED EMBODIMENT

Figure 1:
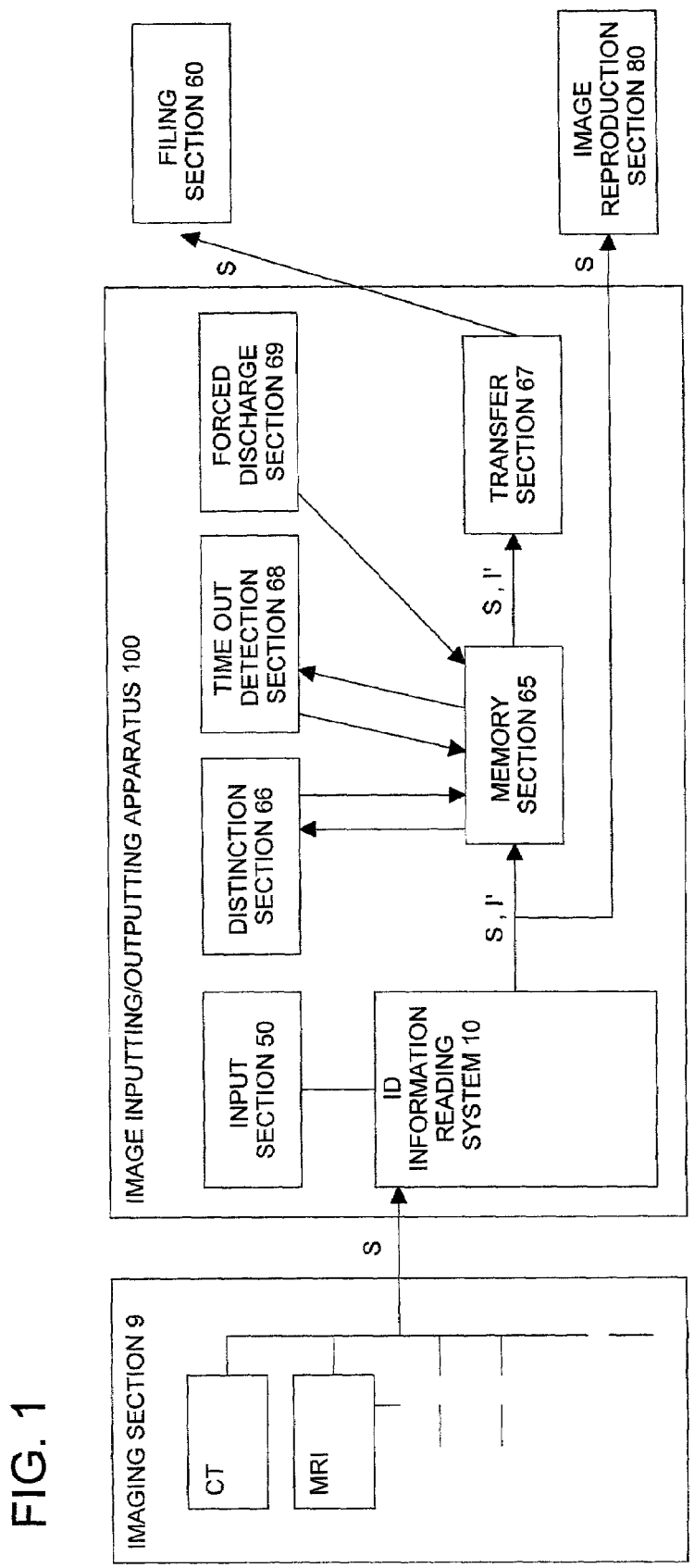
FIG. 1 shows a schematic diagram of the image information apparatus described in this invention.

The following is a concrete description of a physical method of implementing the invention, however, the invention is not limited to this embodiment.

The image information apparatus 100, shown in FIG. 1, will be detailed in the following.

The ID information reading system letter recognition section) 10 is installed in the image inputting/outputting apparatus 100. A receiving section (not shown) receives image information S produced by CT, MRI, and/or other imaging apparatuses in imaging section 9. The ID information reading system reads ID information I' (hereafter referred to as ID information I') contained in image information S, and inputs said image information S and said ID information I' into the memory section 65 described later.

The input section 50 serves to input apparatus information regarding apparatuses which reproduce image information S when the image inputting/outputting apparatus 100 receives image information S to the ID information reading system 10.

Memory section 65 stores image information S in correspondence with ID information I'.

The ID distinction-signal outputting section (hereafter abbreviated to the "distinction section" or "distinction-signal section") 66 determines if ID information I' input into the memory section 65 has changed, and if the distinction results differ, outputs a distinction-signal. The transferring section 67 transfers image information S and ID information I' stored by memory section 65 en bloc (that is, in corresponded form) based on the distinction-signal produced by distinction section 66.

Time out detection section 68 counts a predetermined time until memory section 65 receives said distinction-signal. In the case that said predetermined time interval measured by time out detection section 68 has elapsed (in other words, it has timed out), it transmits to transfer section 67.

Forced discharge section 69 is installed in addition to time out detection section 68 shown in FIG. 1, but can be combined with said time out detection section 68. This forced discharge section is set by the user, and with either no conditions set or certain conditions set, sends a transfer signal to transfer section 67.

Filing section 60, like memory section 65, can file all image information and ID information in correspondence, and can serve as an external information memory section for back up even in the event that the image information S and ID information I' in the memory section 65 have been deleted. Use of filing section 60 in addition to memory section 65 allows users to perform actions (sorting, image layout, etc.) on corresponding information as needed.

Image reproduction section 80 refers to printers, CRTs, and the like used for reproduction of image information S.

Figure 2:
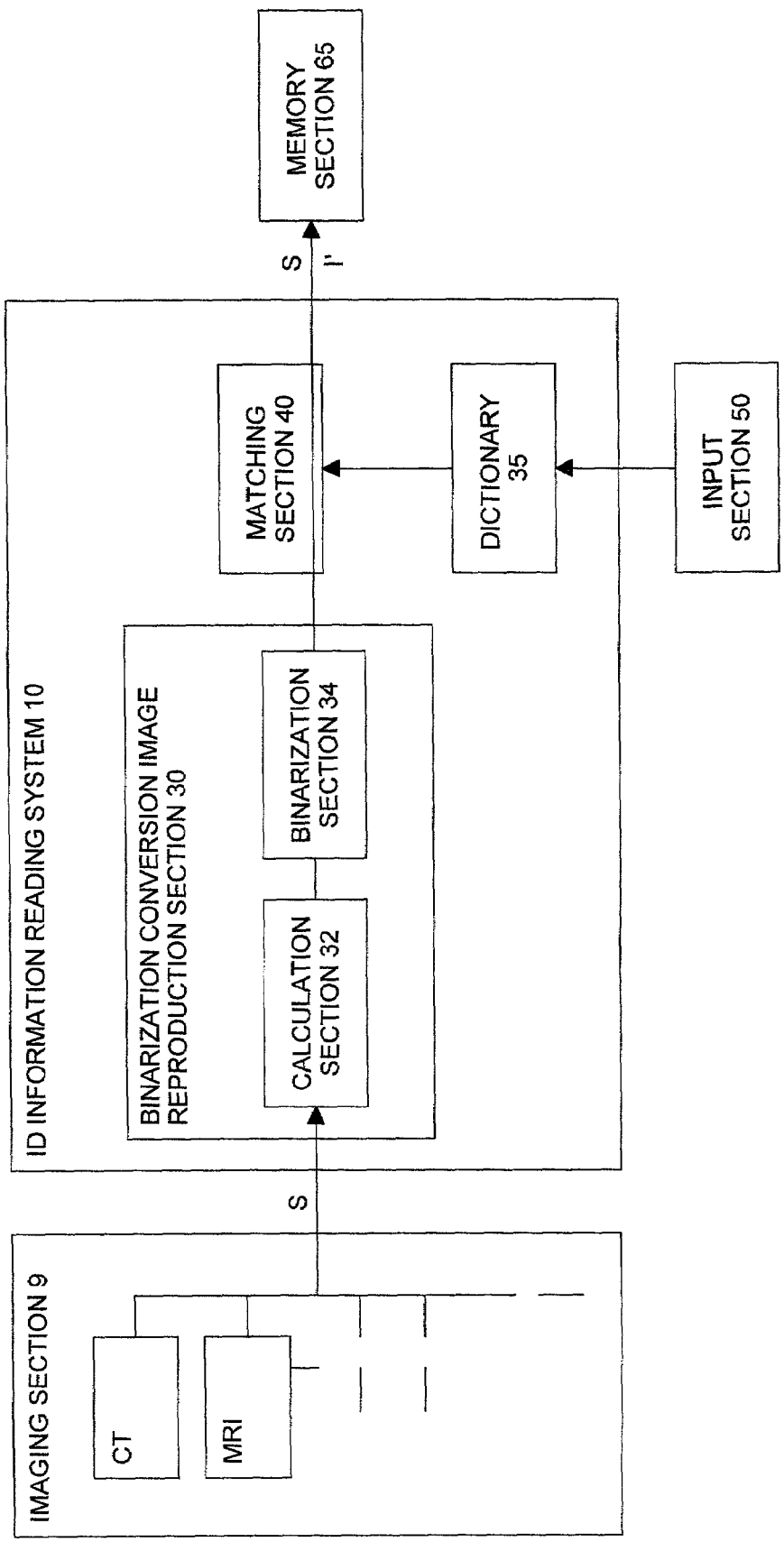
FIG. 2 shows a block diagram of configuration of ID information reading section included in image information apparatus described in this invention.

FIG. 2 is an additionally detailed depiction of ID information reading system 10.

Binarization conversion image reproduction section 30 accepts image information S and converts said image information S to binary and produces a binary reproduction of image information S.

Dictionary 35 contains binarized templates (not shown) that correspond to individual fonts on the apparatuses used to reproduce binary images.

Matching section 40 applies templates to binary images reproduced by binarization conversion image reproduction section 30, and by performing letter pattern matching recognizes letters in ID information (ID information I') and outputs to memory section 65 in correspondence with image information S.

However, binarization conversion image reproduction section 30 is composed of binarization section 34, which extracts an outline of the image after binarizing the individual pixels by comparing the predetermined threshold value with the contrast density required by calculation section 32 and calculation section 32's determination of the difference between the greatest and smallest pixel densities for each pixel in the original image within a predetermined proximity.

In this way, original image data S and ID information I' are corresponded with each other and sequentially entered into memory section 65.

FIG. 3 is a flowchart (3-a) describing application of the invention using the individual sections and individual apparatuses shown in FIGS. 1 and 2, as well as a schematic diagram (3-b and 3-c) of the image information and ID information correspondence performed by the memory section. (3-a) is entitled Bloc Processing as it shows the bundling of image information S and ID information I' stored in memory section 65 based on the distinction-signal produced by distinction-signal section 66, as well as their transfer (in an integrated state).

As shown in 3-b, memory section 65 corresponds and memorizes image information S11–S14 input from ID information reading system 10 and ID information 1 (first ID information), and corresponds and memorizes image information S21–S24 input from ID information reading system 10 and ID information 2 (second ID information).

Distinction-signal section 66 determines whether ID information 1 and ID information 2 are identical. If this process determines that "ID information 1≠ID information 2" then distinction-signal section 66 outputs an distinction-signal that indicates a change of ID information. If memory section 65 received this distinction-signal, it interprets it as a change of patients, and corresponds ID information 1 to image information S11–S14, and corresponds ID information 2 to image information S21–S24 and memory section 65 memorizes them as valid data.

In addition, by sending corresponding ID information 1 and image information S11–S14 to filing section 60 through transfer section 67, ID information 1 and image information S11–S14 in memory section 65 can be erased. In this case, a plurality of images corresponding to the same ID information are managed under a single ID information by the filing section 60, allowing efficient search and reproduction.

On the other hand, if it is determined that "ID information 1=ID information 2", distinction-signal section 66 does not output a distinction signal indicating a switch if ID information (in some cases it sends a distinction-signal that indicates that the ID information is the same). In this event, memory section 65 determines that the patient has not changed. By then erasing ID information 2 or replacing ID information 1, image information S21–S24 can be corresponded to ID information 1 in addition to image information S11–S14.

As a result, as is shown in 3-c, memory section 65 memorizes ID information and image information in correspondence.

FIG. 4 is a flowchart (4-a) describing control based on a timer according to the invention using the individual sections and individual apparatuses shown in FIGS. 1 and 2, as well as a schematic diagram (4-b and 4-c) of the image information and ID information correspondence performed by the memory section.

(4-a) is entitled Time Out and Forced Discharge Process as it shows the flow of time out and forced discharge.

As shown in 4-b, memory section 65 corresponds and memorizes image information S11–S14 input from ID information reading system 10 and ID information 1 (first ID information). Distinction-signal section 66 determines whether ID information 1 has changed. If this process determines that "ID information 1 has changed (for example, as shown in FIG. 3, it determines that ID information 1≠ID information 2)", then time out detection section 68 (timer) clears the time it has counted down based on the predetermined timer value since the memory section 65 received image information S11–S14 (same as the distinction signal is occurred), and starts the countdown again at the predetermined value.

If this process determines that "ID information 1 has not changed (for example, as shown in FIG. 3, it determines that ID information 1=ID information 2)", then memory section 65 keeps defined ID information (for example, ID information 1) and the corresponding image information (for example, image information S11–S14), but if time out detection section 68 detects that the predetermined time interval has passed (in other words, it has timed out), then it sends a transfer signal to transfer section 67.

Because of this transfer signal, ID information 1 and corresponding image information S11–S14 are sent by transfer section 67 to filing section 60, deleting ID information 1 and image information S11–S14 from memory section 65.

Even if time out detection section 68 does not detect that the predetermined time interval has passed, forced discharge can be performed by the user with either no conditions set or certain conditions set through forced discharge section 69, sending a transfer signal to transfer section 67. Because of this transfer signal, ID information 1 and corresponding image information S11–S14 are sent by transfer section 67 to filing section 60, deleting ID information 1 and image information S11–S14 from memory section 65. Needless to say, if a transfer signal is not sent by forced discharge section 69, ID information change will be confirmed again by distinction-signal section 66.

4-c shows the deletion of data in the memory section through time out or forced discharge. Even if there is no change to ID information, forced discharge can be directed externally, transferring data to filing section 60, thereby allowing emergency response.

Figures 5, 6:
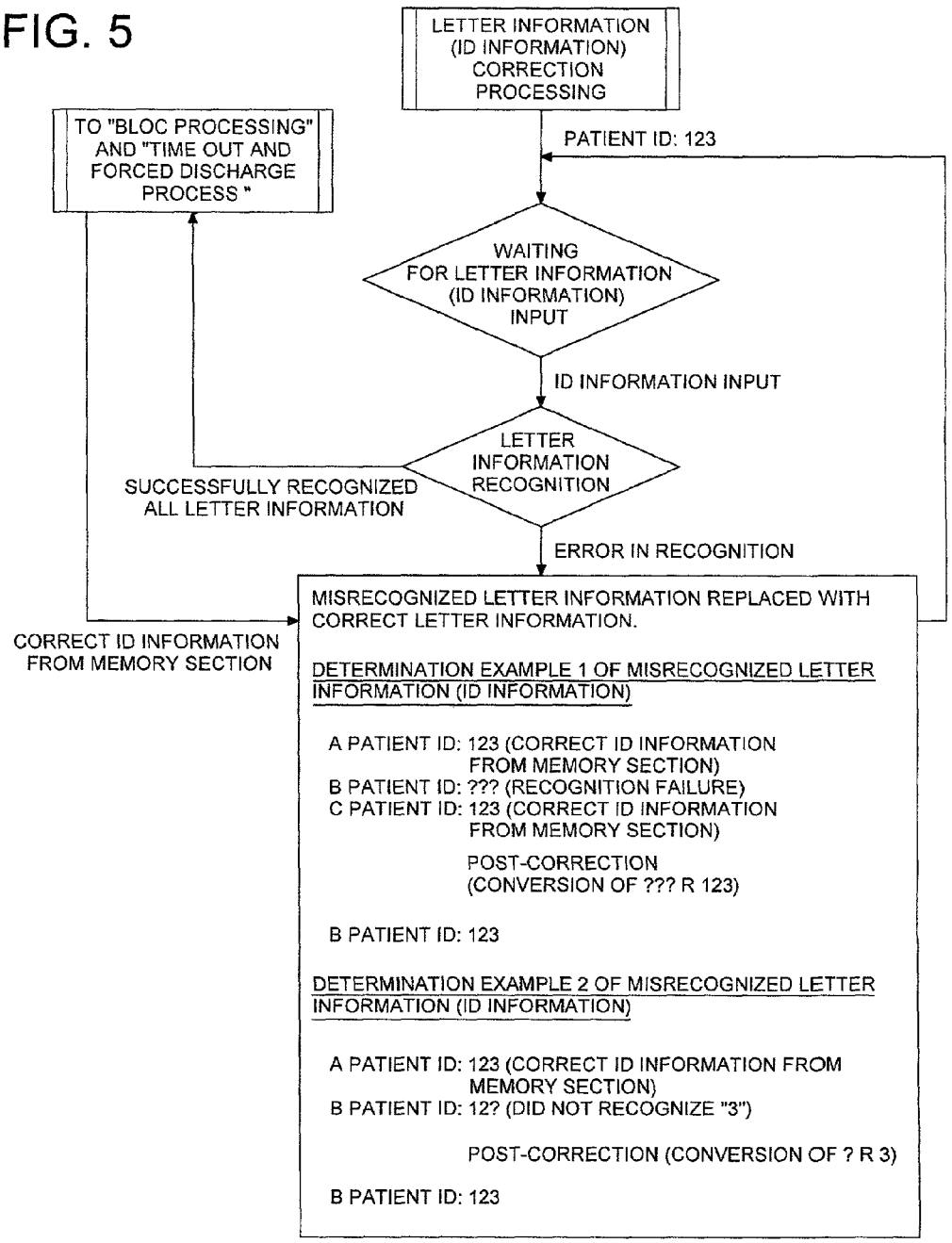
FIG. 5 shows an explanatory flowchart of corrective processing for unsuccessful letter recognition.
FIG. 6 shows an explanatory illustration of video noise example.
Figure 7:
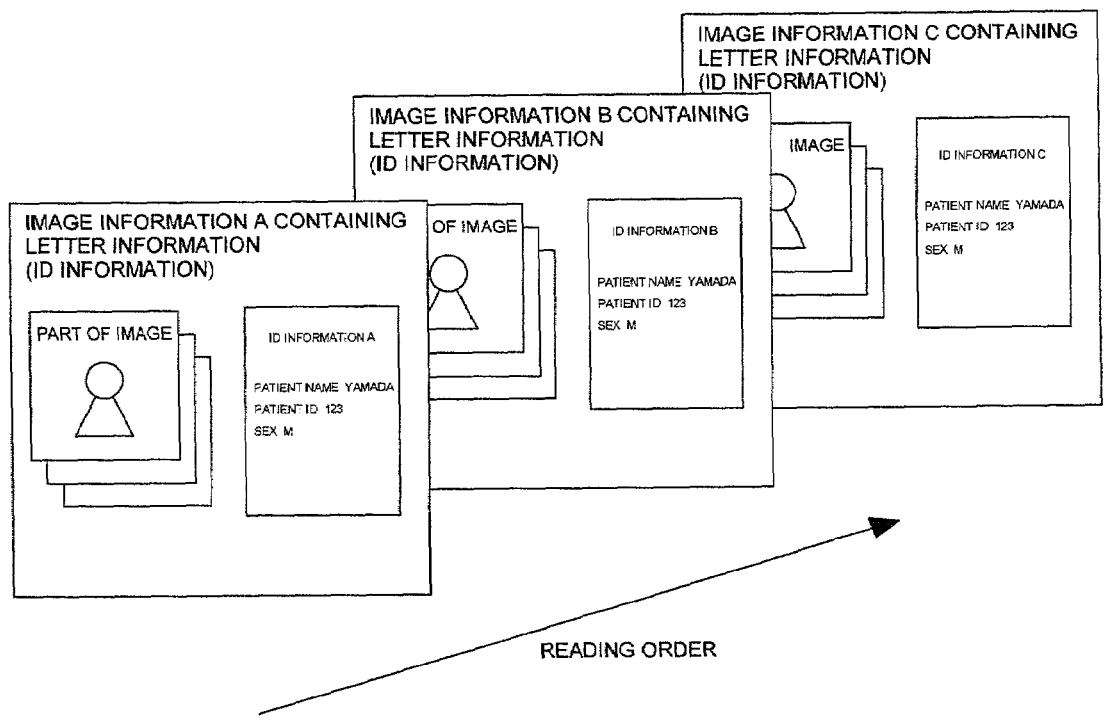
FIG. 7 shows an illustration for explaining a process of obtaining ID information.

Following is an explanation based on FIG. 5 and FIG. 6 of letter information correction processing when ID information reading system (letter recognition section) 10 misread letters.

When the ID information read by ID information reading system 10 contains at least one letter, the validity of the letter information is determined by distinction-signal section 66 or other distinction sections (not shown). Determination of recognition validity is based on inclusion of special sets of letter information, such as "9999", strings including "?", such as "123?", and the presence of marks which indicate that letter recognition has failed. The "?" described above represents letters which could not be recognized during letter recognition (corresponding to a discrimination-signal), and other letters or symbols may be used. If letter recognition is successful, ID information is defined, so the flow continues onto the aforementioned FIG. 3 and FIG. 4 "Bloc processing" and "Time out and forced discharge process", and image processing continues.

FIG. 5 shows the comparison of letter information memorized in memory section 65 to the letter information immediately before and the letter information immediately after a misread string as determined by distinction-signal section 66 or other distinction sections (not shown). If the letter information immediately before and the letter information immediately after are identical, the letter information is determined (overwrite: ???→123), and automatically repaired. Said 1, 2, and 3 correspond to letter-signals output when said prescribed distinction-signal is not output. In addition, comparison of the letter information immediately before and the letter information immediately after a misread string, with determination that strings containing "?" are identical if they share more than a certain number of letters, is acceptable. For example, if the misread letter information is "1 2?", and the letter information for the immediately preceding and following images is "1 2 3" and the number of common characters is 2 (in the flow chart, the case of the determination example 2), by changing "?" to "3" (i.e. converting the discrimination-signal to a letter signal), the misread image letter information can be corrected to "1 2 3", and not only preceding but also following misread images can have their letter information determined by the same method.

After misread letter information is determined by said method, ID information is determined, so the flow continues onto the aforementioned FIG. 3 and FIG. 4 "Bloc processing" and "Time out and forced discharge process", and image processing continues.

This invention proposes an image information apparatus which assigns a single ID to a plurality of images for a single patient using recognition of ID information in images (letter recognition), allowing efficient image data filing, as well as efficient image data searching and reproduction.

Further, even if there is no change in ID information, by sending information to the filing apparatus, stored information can be deleted from the memory section. Because of this, the load on the memory section is decreased, allowing emergency utilization when a certain patient's images are necessary.

Still further, because IDs must contain at least one letter, and ID information must contain at least one letter signal to correspond to said letter, the ID information reading system can read at least one said letter signal of said letters of said ID. Because of this, confirmation of valid ID recognition is based on segmentalized letter information units, increasing the recognition capability of the ID recognition section.

Still further, even if letter recognition is not successful, operators do not need to correct each individual error, and image data and letter information can be corresponded and memorized.

Disclosed embodiment can be varied by a skilled person without departing from the spirit and scope of the invention.

What is claimed is:

1. A medical image information processing apparatus for filing a plurality of items of sheet-shaped image information generated by an image information generating section, wherein each said item of sheet-shaped image information includes a medical image of a patient and an ID image to indicate ID data of the patient, said apparatus comprising:

a receiving section to receive the plurality of items of sheet-shaped image information sequentially from the image information generating section;

an ID information reading section to read the plurality of items of sheet-shaped image information sequentially, to recognize a shape of the ID image of each said read item of sheet-shaped image information, and to generate ID information based on the recognized shape of the ID image, so as to generate an item of ID information for each said read item of sheet-shaped image information;

an ID distinction section to receive sequentially a plurality of the generated items of ID information, to judge whether ID data of each said received item of ID information coincides with ID data of an immediately previous item of ID information, and to output an ID distinction-signal when it is judged that the ID data of the item of ID information does not coincide with the ID data of the immediately previous item of ID information; and a memory section which, when the ID distinction-signal is received, stores a plurality of items of sheet-shaped image information received before the output of the ID distinction-signal such that said plurality of stored items of sheet-shaped image information are stored as a set of data in correspondence with a single said item of the ID information corresponding thereto.

2. The medical image information apparatus of claim 1, further comprising:

a timer section to count a predetermined time interval beginning at a time when the receiving section receives a first item of sheet-shaped image information;

wherein, if the predetermined time interval elapses before the memory section receives the ID distinction-signal, the memory section stores items of sheet-shaped image information that are accumulated during the predetermined time interval, in correspondence with said single item of the ID information.

3. The medial image information apparatus of claim 1, wherein the ID image includes an image of at least one letter and the ID information includes at least one letter-signal corresponding to the letter.

4. The medical image information apparatus of claim 3, wherein the ID information reading section comprises:

a discrimination-signal generator that outputs a discrimination-signal in place of the letter-signal when the ID information reading section does not identify the image of the letter; and a converter to convert the discrimination-signal outputted by the discrimination-signal generator into a letter-signal corresponding to the image of the letter.

5. The medical image information apparatus of claim 1 wherein the memory section memorizes the judged item of ID information as the immediately previous item of ID information, and stores the item of sheet-shaped image information corresponding to the judged item of ID information in correspondence with the item of the ID information corresponding to the first item of sheet-shaped image information.

6. The medial image information apparatus of claim 1, further comprising a transferring section that transfers said stored plurality of items of sheet-shaped image information received before the output of the ID distinction signal, to a prescribed image storing device while correlating the transferred items of sheet-shaped image data with said single item of the ID information.

7. A medical image information processing apparatus for filing a plurality of items of sheet-shaped image information generated by an image information generating section, wherein each said item of sheet-shaped image information includes a medical image of a patient and an ID image to indicate ID data of the patient, said apparatus comprising:

a receiving section to receive the plurality of items of sheet-shaped image information sequentially from the image information generating section;

an ID information reading section to read the plurality of items of sheet-shaped image information sequentially, to recognize a shape of the ID image for each said read item of sheet-shaped image information, and to generate ID information based on the recognized shape of the ID image for each of the plurality of items of sheet-shaped image information sequentially; and a memory section to store a plurality of items of sheet-shaped image information such that when the memory section receives ID information having ID data different from ID data of previously-received ID information, the memory section stores a plurality of items of sheet-shaped image information received before receiving the ID information having the different ID data as a set of data in correlation with a single item of the ID information corresponding thereto.

8. The medical image information apparatus of claim 7, further comprising:

a timeout-detection section to detect whether a predetermined time interval has elapsed by counting time beginning at a time when the receiving section receives one said distinction-signal;

wherein when the timeout-detection section detects that the predetermined time interval has elapsed before the memory section receives a next ID distinction-signal, the memory section memorizes a plurality of items of the sheet-shaped image information that are accumulated during the predetermined time interval after the receiving section receives the sheet-shaped image information, in correspondence with a same item of the ID information.

* * * * *